UNITED STATES PATENT OFFICE.

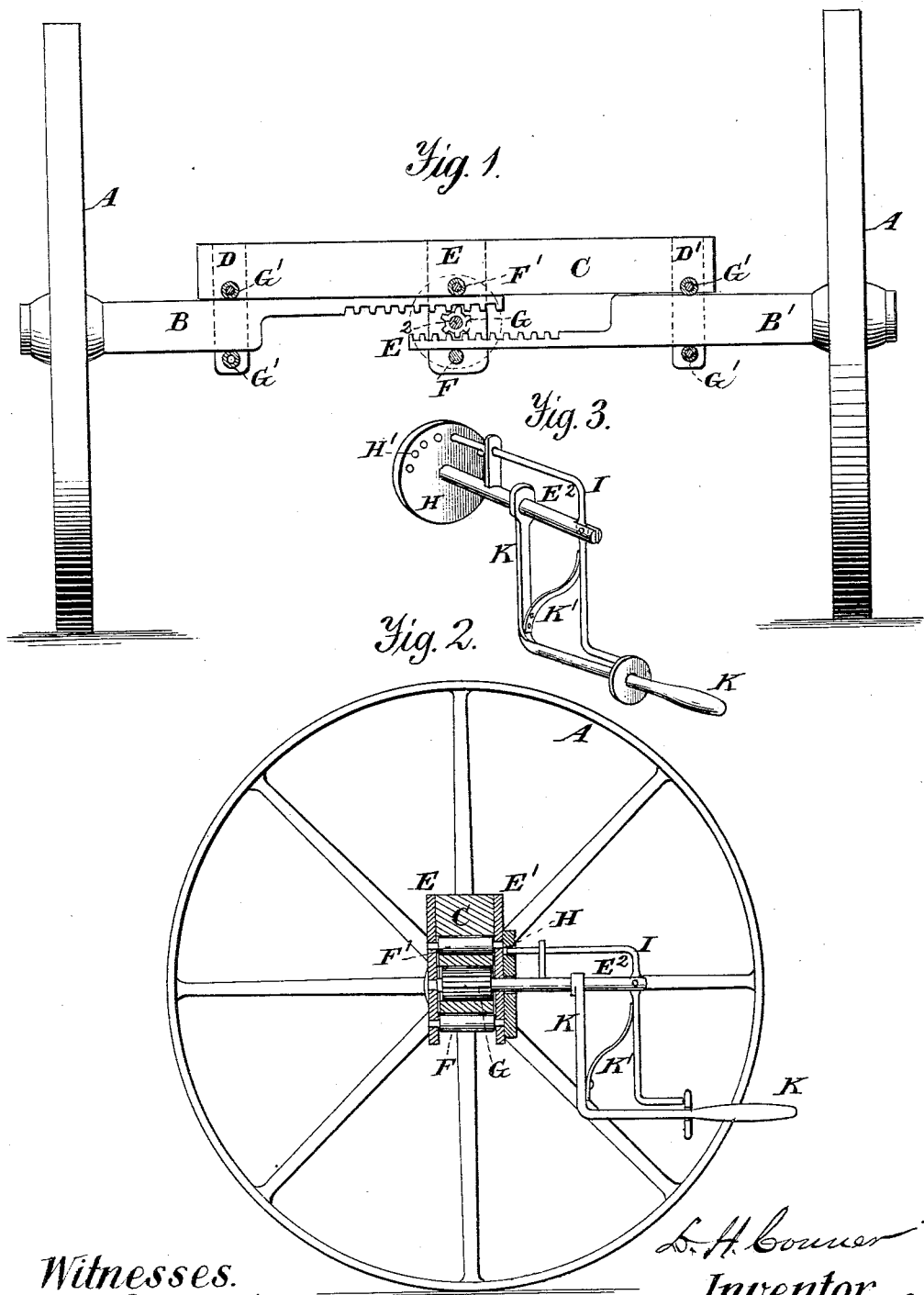

LAURANCE H. CONNER, OF GRAND VIEW, TEXAS.

CULTIVATOR.

SPECIFICATION forming part of Letters Patent No. 243,216, dated June 21, 1881.

Application filed May 14, 1881. (No model.)

*To all whom it may concern:*

Be it known that I, LAURANCE H. CONNER, a citizen of the United States, residing at Grand View, in the county of Johnson and State of Texas, have invented certain new and useful Improvements in Cultivators; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

My invention relates to improvements in cultivators and other implements in which it is requisite that provision should be made for increasing and decreasing the distance between their carrying-wheels; and the objects of my improvements are, first, to provide for use in such implements a sectional axle which shall be capable of being so manipulated as to cause the wheels to be placed at a greater or less distance from each other; second, to provide the necessary mechanism and suitable combinations thereof for moving the parts of the axle and the wheels into their desired positions. I attain these objects by the use of the devices illustrated in the accompanying drawings, in which—

Figure 1 is a rear-end view of so much of a cultivator as is necessary to show my improvements, it showing the carrying-wheels, the sectional axle, the geared pinion for moving the sections and the wheels, a bolster placed on the top of the axle, and guides for the sections of the axle to move in. Fig. 2 is a central sectional elevation, showing the mechanism for moving the sections of the axle and for holding them in their adjusted positions. Fig. 3 is a perspective view, showing a disk for holding the parts in position, a dog for entering said disk, and a crank for operating the parts in moving the wheels.

Similar letters refer to similar parts throughout the several views.

It is well known that the rows of different kinds of crops are placed at different distances apart, and it is equally true that the rows of the same kind of crops are placed at different distances from each other in different parts of the country, and hence a difficulty has arisen in adapting the wheels of cultivators to the various conditions, as no provision is made in them for readily adjusting their carrying-wheels to the rows. I have sought to provide a remedy for this objection, and to provide a means whereby the carrying-wheels of a cultivator, a single or gang plow, a grain-drill, and other similar implements may have their carrying-wheels adjusted to the proper distances apart for adapting them to the circumstances under which they are to be used.

In constructing cultivators and other implements having my improvements applied thereto I employ two carrying-wheels, A A, of any desired diameter and of any preferred form of construction, preferring to make their faces of different widths to adapt them to the kind of ground over which they are to pass. These wheels are each mounted upon a section of an axle, B B', said sections being of any required length, and each provided upon the outer ends with spindles for the reception of the wheels. The sections B and B' are at their inner ends reduced in depth, and have their inner surfaces provided with cogs, as shown in Fig. 1, the parts upon which said cogs are formed being, by preference, made of iron, and the entire sections may advantageously be made of the same material. For holding the sections in their proper positions a bolster, C, is placed upon their upper surfaces, as shown in Fig. 1. Near the ends of the bolster there are placed bands D D', of metal, which are firmly secured thereto, and are made to embrace the sections of the axle.

At the center of the space between the wheels, or of the bolster, there are provided plates of metal, E E', which are firmly secured to said bolster, they being provided with openings for the passage of a shaft, $E^2$, and also with openings for the passage of two rollers, F F', which are at such a distance from each other as to permit the reduced portions of the axles to pass between them, and to keep their cogged inner surfaces in contact with a pinion, G, which is secured to the shaft $E^2$, and is located between the cogged surfaces of the sections of the axle.

In order that the parts of the axle may be readily moved for adjusting the positions of the wheels with the expenditure of the least possible amount of force, the straps D D' are provided with friction-rollers G', they being so placed in the straps as to bear upon the upper and lower surfaces of the sections of the axle B B'.

The above-described parts, when arranged as shown, constitute means of readily moving the wheels A A to a position more or less distant from each other, and thus enabling the operator to cause them to run nearer to or farther from the rows of a growing crop, or to adapt them to other circumstances when they are used in other implements.

For the purpose of changing the positions of the wheels readily there is placed upon the shaft $E^2$ a disk, H, which has in it a series of holes, H'; or, if preferred, these holes may be formed in the plate E'. When the disk is used it is secured to the plate, and the shaft is made to turn in it, in order that a dog, I, may be allowed to enter some one of the holes H' formed therein, and thus hold the sections of the axle in their adjusted positions, such adjustment being effected by a crank, K, placed on the shaft $E^2$, outside of the disk, and provided with a spring, K', the free end of which bears against a portion of the dog I, as shown in Figs. 2 and 3, and holds it in the hole in disk H, in which it may for the time be placed. This dog is so bent that its outer end comes nearly in contact with the handle of the crank K, in order that when the operator grasps said crank with his hand for the purpose of turning it the same action shall withdraw the dog from the disk, and thus permit both to turn together, which will always be the action of the parts, as the fulcrum upon which the dog turns is located in the end of the shaft to which the crank is fixed, and its inner end is supported in a stud secured to said shaft.

Having thus described my invention, what I claim, and desire to secure by Letters Patent, is—

1. In a cultivator or other agricultural implement, the combination of carrying-wheels A A, a sectional axle consisting of parts B B', each of said sections being provided upon its inner surface with cogs or teeth, and moving in suitable guides attached to a bolster carried thereon, and a geared pinion placed between the cogged sections of the axle, the parts being arranged for joint operation, substantially as set forth.

2. The combination, in a cultivator or other agricultural implement, of the carrying-wheels, two movable cogged sections of an axle, a pinion placed between said cogged portions, and a bolster carrying guides for the sections of the axle, and friction-rollers for facilitating the movements of the sections of the axle, substantially as set forth.

3. In combination with the adjustable sections of an axle for a cultivator or other agricultural implement, a geared pinion placed between the geared portions of the sections of the axle, the perforated disk H, shaft $E^2$, dog I, and spring K, the parts being arranged for joint operation, substantially as described.

In testimony whereof I affix my signature in presence of two witnesses.

LAURANCE H. CONNER.

Witnesses:
L. C. YOUNG,
GEO. F. GRAHAM.